United States Patent
Yamashita et al.

(10) Patent No.: US 9,945,967 B2
(45) Date of Patent: *Apr. 17, 2018

(54) RADIATION DETECTOR

(71) Applicant: HAMAMATSU PHOTONICS K.K., Hamamatsu-shi, Shizuoka (JP)

(72) Inventors: Takaji Yamashita, Hamamatsu (JP); Hiroshi Uchida, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/008,904

(22) Filed: Jan. 28, 2016

(65) Prior Publication Data

US 2016/0223688 A1 Aug. 4, 2016

(30) Foreign Application Priority Data

Jan. 30, 2015 (JP) ................. 2015-016655

(51) Int. Cl.
*G01T 1/20* (2006.01)
*G01T 1/164* (2006.01)
*G01T 1/29* (2006.01)

(52) U.S. Cl.
CPC .......... *G01T 1/2985* (2013.01); *G01T 1/1644* (2013.01); *G01T 1/20* (2013.01)

(58) Field of Classification Search
CPC ........ G01T 1/2985; G01T 1/1644; G01T 1/20
See application file for complete search history.

(56) References Cited

U.S. PATENT DOCUMENTS

2013/0306876 A1* 11/2013 Uchida ................. G01T 1/1644
250/366
2015/0028218 A1* 1/2015 Kataoka ................ G01T 1/1644
250/367

FOREIGN PATENT DOCUMENTS

WO WO-2012/093526 A1 7/2012
WO WO-2012/105292 A1 8/2012

* cited by examiner

*Primary Examiner* — David Porta
*Assistant Examiner* — Mindy Vu
(74) *Attorney, Agent, or Firm* — Drinker Biddle & Reath LLP

(57) ABSTRACT

A radiation detector includes: a first scintillator including a first end surface and a second end surface; a second scintillator including a first end surface and a second end surface; a first photodetector detects light emitted from the first end surface of each of the first and second scintillators; a second photodetector c detects light emitted from the second end surface of each of the first and second scintillators; and a position specifying unit configured to specify each radiation incident position on which each radiation has been incident in each of the first and second scintillators, wherein an area of the first end surface of the first scintillator is smaller than an area of the second end surface of the first scintillator, and an area of the first end surface of the second scintillator is larger than an area of the second end surface of the second scintillator.

8 Claims, 13 Drawing Sheets

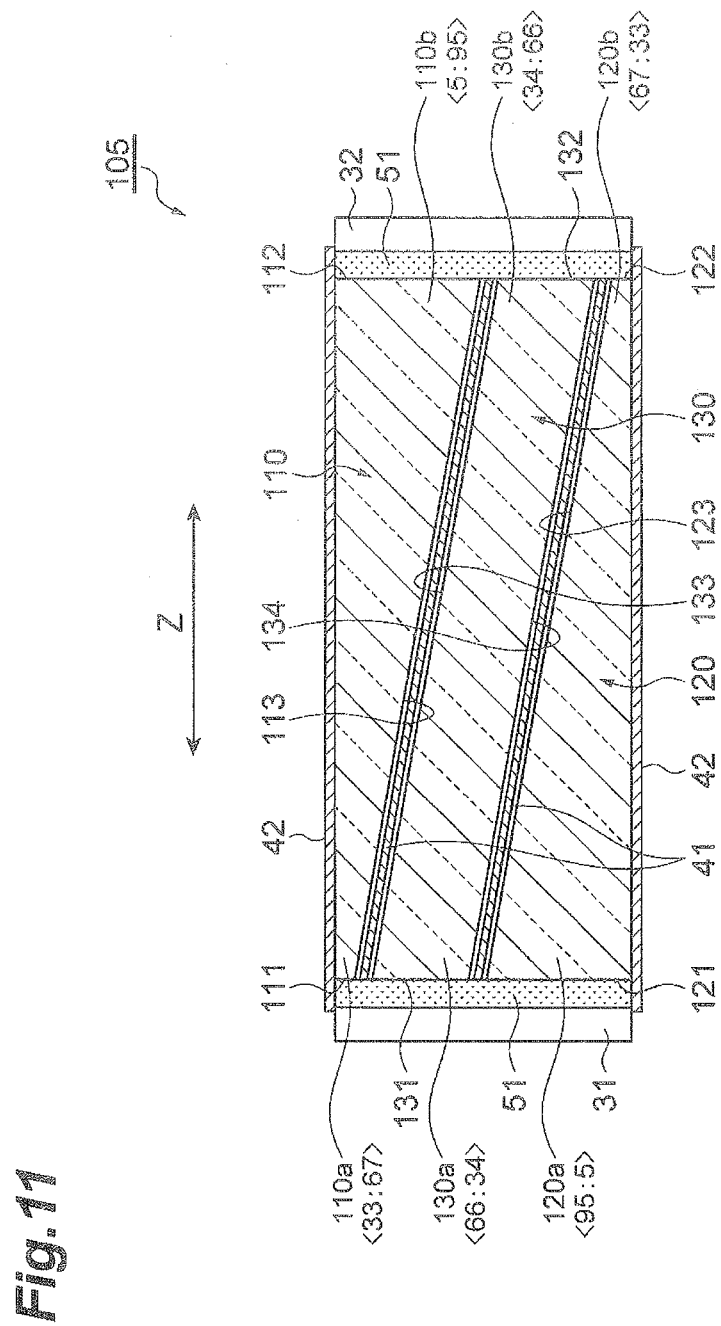

RADIATION DETECTOR

TECHNICAL FIELD

One aspect of the present invention relates to a radiation detector.

BACKGROUND

In the related art, it has been known a radiation detector including: a scintillator including a first end surface and a second end surface opposite to in a predetermined direction; a first photodetector that detects light emitted from the first end surface of the scintillator; a second photodetector that detects light emitted from the second surface of the scintillator, and a position specifying unit that specifies a radiation incident position on which a radiation has been incident in the scintillator, based on each result detected by the first and second photodetectors (for example, referred to WO 2012/105292 and WO 2012/093526).

SUMMARY

The above radiation detector may be used as a three-dimensional radiation position detector (a depth of interaction (DOI) detector) in a PET apparatus. This kind of radiation detector is required to accurately specify a radiation incident position (a detector position) in order to obtain the information on the object to be measured with high time resolution, high sensitivity, and high resolution.

An object of one aspect of the present invention is to provide a radiation detector capable of accurately specifying a radiation incident position.

A radiation detector according to one aspect of the present invention includes; a first scintillator including a first end surface positioned on a side of a first end in a predetermined direction, and a second end surface opposite to the first end surface and positioned on a side of a second end in the predetermined direction; a second scintillator disposed in parallel to the first scintillator in a direction intersecting the predetermined direction, and including a first end surface positioned on a side of a first end in the predetermined direction and a second end surface opposite to the first end surface and positioned on a side of a second end in the predetermined direction; a first photodetector configured to detect light emitted from the first end surface of each of the first and second scintillators; a second photodetector configured to detect light emitted from the second end surface of each of the first and second scintillators; and a position specifying unit configured to specify each radiation incident position on which each radiation has been incident in each of the first and second scintillators based on each result detected by the first and second photodetectors. An area of the first end surface of the first scintillator is smaller than an area of the second end surface of the first scintillator. An area of the first end surface of the second scintillator is larger than an area of the second end surface of the second scintillator.

In the radiation detector, the first and second scintillators are disposed in parallel in the direction intersecting the predetermined direction between the first and second photodetectors. Therefore, a plurality of scintillators is disposed in the direction intersecting the predetermined direction and a width of each of the scintillators becomes narrow. As a result, sampling density can be improved so that spatial resolution can be also improved. The area of the first end surface of the first scintillator and the area of the first end surface of the second scintillator are different from the area of the second end surface of the first scintillator and the area of the second end surface of the second scintillator, respectively. The area of the first end surface of the first scintillator is smaller than the area of the second end surface of the first scintillator. The area of the first end surface of the second scintillator is larger than the area of the second end surface of the second scintillator. Accordingly, each of the first and second scintillators can differentiate an amount of the incident light on the first photodetector and an amount of the incident light on the second photodetector, in accordance with a radiation incident position (an emitting position) in the predetermined direction. As a result, based on the different amount of the incident light, the position specifying unit can specify the radiation incident positions in the predetermined direction in the first and second scintillators. As described above, the radiation detector according to the aspect of the present invention can accurately specify a radiation incident position.

In the radiation detector according to one aspect of the present invention, at least one of the first and second scintillators may include a side surface including an inclined surface inclining to a plane parallel to the predetermined direction. Accordingly, the number of reflection of light emitted by an incident radiation in at least one of the first and second scintillators until the light reaches each of the end surfaces, is inhibited. As a result, the light is promptly guided to each of the end surfaces in at least one of the first and second scintillators.

The radiation detector according to one aspect of the present invention may further include an optical reflector disposed between the first and second scintillators. Accordingly, light emitted by an incident radiation in any one of the first and second scintillators, is inhibited from leaking into the other scintillator. As a result, each light emitted in the first and second scintillators is securely guided to each of the end surfaces of the first and second scintillators, respectively.

In the radiation detector according to one aspect of the present invention, in a case where a sum of a first light quantity of the amount of the light incident on the first photodetector and a second light quantity of the amount of the light incident on the second photodetector is defined as a reference value, a distribution ratio regarding a ratio between the first light quantity and the second light quantity mutually differs between when an emission occurs at a first end portion on the side of the first end in the predetermined direction in the first scintillator and when an emission occurs at a second end portion on the side of the second end in the predetermined direction in the first scintillator. The distribution ratio regarding the ratio between the first light quantity and the second light quantity mutually differs between when an emission occurs at a first end portion on the side of the first end in the predetermined direction in the second scintillator and when an emission occurs at a second end portion on the side of the second end in the predetermined direction in the second scintillator. In a case where the distribution ratio is defined as A:B when the emission occurs at the first end portion of the first scintillator and the distribution ratio is defined as C:D when the emission occurs at the second end portion of the second scintillator, A<C and B>D may be satisfied. Accordingly, when each radiation is incident on each of the first and second scintillators, the above distribution ratio can be securely differentiated. As a result, the radiation detector according to the aspect of the present invention can securely specify a radiation incident position.

The radiation detector according to one aspect of the present invention may further include: a third scintillator disposed in parallel between the first and second scintillators, and including a first end surface positioned on the side of a first end in the predetermined direction, and a second end surface opposite to the first end surface and positioned on a side of a second end in the predetermined direction. The first photodetector may further detect light emitted from the first end surface of the third scintillator. The second photodetector may further detect light emitted from the second end surface of the third scintillator. The position specifying unit may specify each radiation incident position on which each radiation has been incident in each of the first, second, and third scintillators based on each result detected by the first and second photodetectors. An area of the first end surface of the third scintillator may be larger than the area of the first end surface of the first scintillator and be smaller than the area of the first end surface of the second scintillator. An area of the second end surface of the third scintillator may be smaller than the area of the second end surface of the first scintillator and be larger than the area of the second end surface of the second scintillator. Accordingly, the first, second, and third scintillators are disposed in parallel in a direction intersecting the predetermined direction between the first and second photodetectors. As a result, sampling density can be further improved and spatial resolution of a radiation incident position can be further improved.

In the radiation detector according to one aspect of the present invention, in a case where a sum of a first light quantity of the amount of the light incident on the first photodetector and a second light quantity of the amount of the light incident on the second photodetector is defined as a reference value, a distribution ratio regarding a ratio between the first light quantity and the second light quantity mutually differs between when an emission occurs at a first end portion on the side of the first end in the predetermined direction in the first scintillator and when an emission occurs at a second end portion on the side of the second end in the predetermined direction in the first scintillator. The distribution ratio regarding the ratio between the first light quantity and the second light quantity mutually differs between when an emission occurs at a first end portion on the side of the first end in the predetermined direction in the second scintillator and when an emission occurs at a second end portion on the side of the second end in the predetermined direction in the second scintillator. The distribution ratio regarding the ratio between the first light quantity and the second light quantity mutually differs between when an emission occurs at a first end portion on the side of the first end in the predetermined direction in the third scintillator and when an emission occurs at a second end portion on the side of the second end in the predetermined direction in the third scintillator. In a case where the distribution ratio is defined as A:B when the emission occurs at the first end portion of the first scintillator, the distribution ratio is defined as C:D when the emission occurs at the second end portion of the second scintillator, the distribution ratio is defined as E:F when the emission occurs at the first end portion of the third scintillator, and the distribution ratio is defined as G:H when the emission occurs at the second end portion of the third scintillator, A<G<E<C and B>H>F>D may be satisfied. Accordingly, when each radiation is incident on each of the first, second, and third scintillators, the above distribution ratio can be securely differentiated. As a result, a radiation incident position can be securely specified in the configuration including the first, second, and third scintillators.

BRIEF DESCRIPTION OF THE DRAWINGS

FIG. 11 is a cross-sectional view of a radiation detecting unit in a radiation detector according to the second embodiment.

DETAILED DESCRIPTION

Preferred embodiments will be described in detail below with reference to the drawings. Note that the same or similar elements in the following descriptions are denoted with the same reference signs, and the duplicate descriptions thereof will be omitted.

First Embodiment

Figure 1:
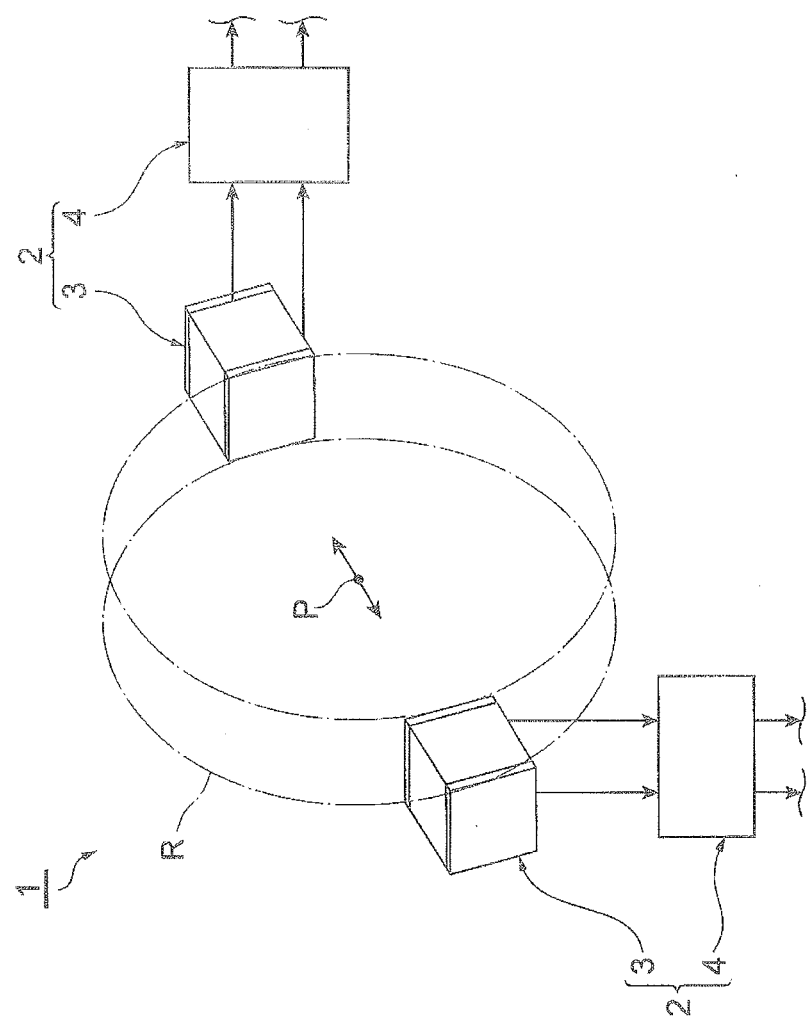
FIG. 1 is a schematic view of a configuration of a PET apparatus including a radiation detector according to a first embodiment.

FIG. 1 is a schematic view of a configuration of a PET apparatus 1 including a radiation detector 2 according to a first embodiment. The PET apparatus 1 is an apparatus that measures a radiation generated by annihilation between an electron and a positron (for example, a gamma ray) in one object to be measured P, such as a human body, an animal, or a plant, to which a substance including a positron-emitting nuclide has been administered, and obtains information on a distribution and a movement of the administered substance in the object to be measured P. The PET apparatus 1 includes a plurality of radiation detectors 2 disposed on the circumference of a circle R having the object to be measured P as a substantially center. The PET apparatus 1 simultaneously measures two radiations that have been incident on a pair of radiation detectors 2 positioned on both sides so as to interpose the object to be measured P. As a result, the PET apparatus 1 obtains the information on the distribution and the movement of the administered substance in the object to be measured P.

Figure 2:
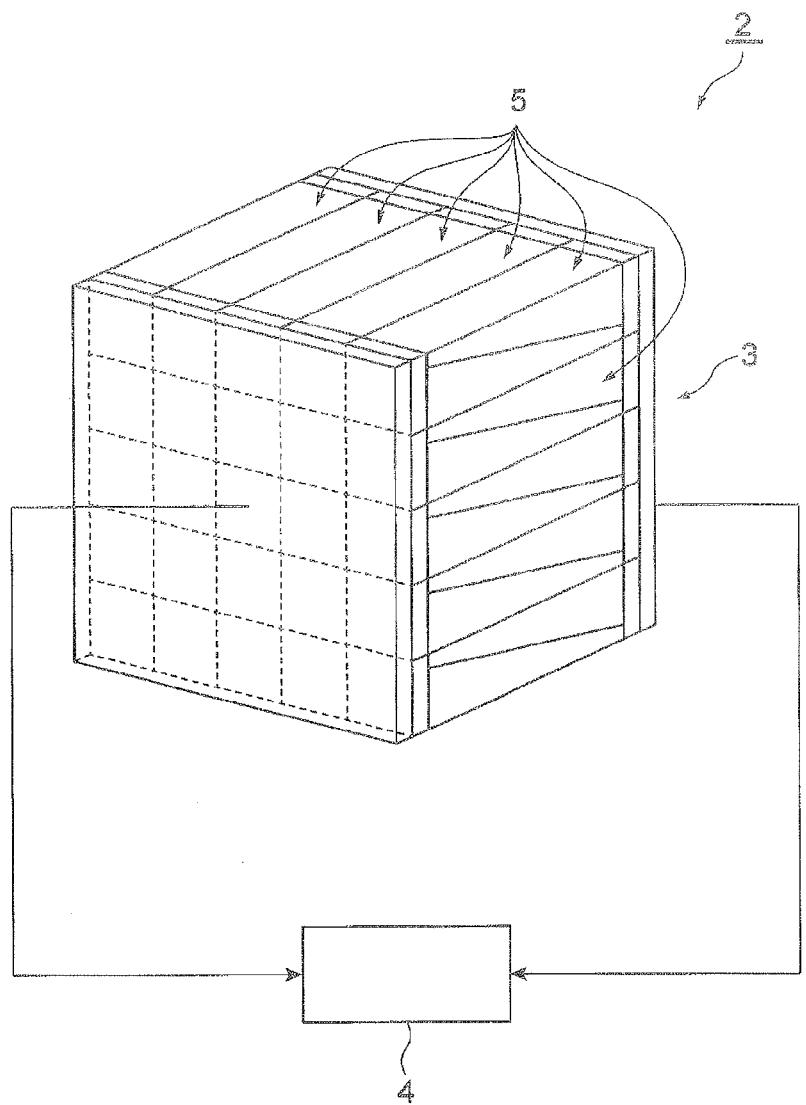
FIG. 2 is a perspective view of the radiation detector in FIG. 1.

FIG. 2 is a perspective view of the radiation detector 2 in FIG. 1. As illustrated in FIG. 2, the radiation detector 2 includes a radiation detecting unit 3 and a position specifying unit 4. The radiation detecting unit 3 detects scintillation light (light) that is emitted in accordance with a radiation, such as a gamma ray, that has been incident, and then outputs a signal corresponding to intensity of the scintillation light. Based on the signal output from the radiation detecting unit 3, the position specifying unit 4 specifies a radiation incident position at which the radiation has been incident on the radiation detecting unit 3.

The radiation detecting unit 3 includes a plurality of radiation detecting units 5. The plurality of radiation detecting units 5 is two-dimensionally arranged. The adjacent radiation detecting units 5 are secured by, for example, adhesion so as to be integrally formed.

Figure 3:
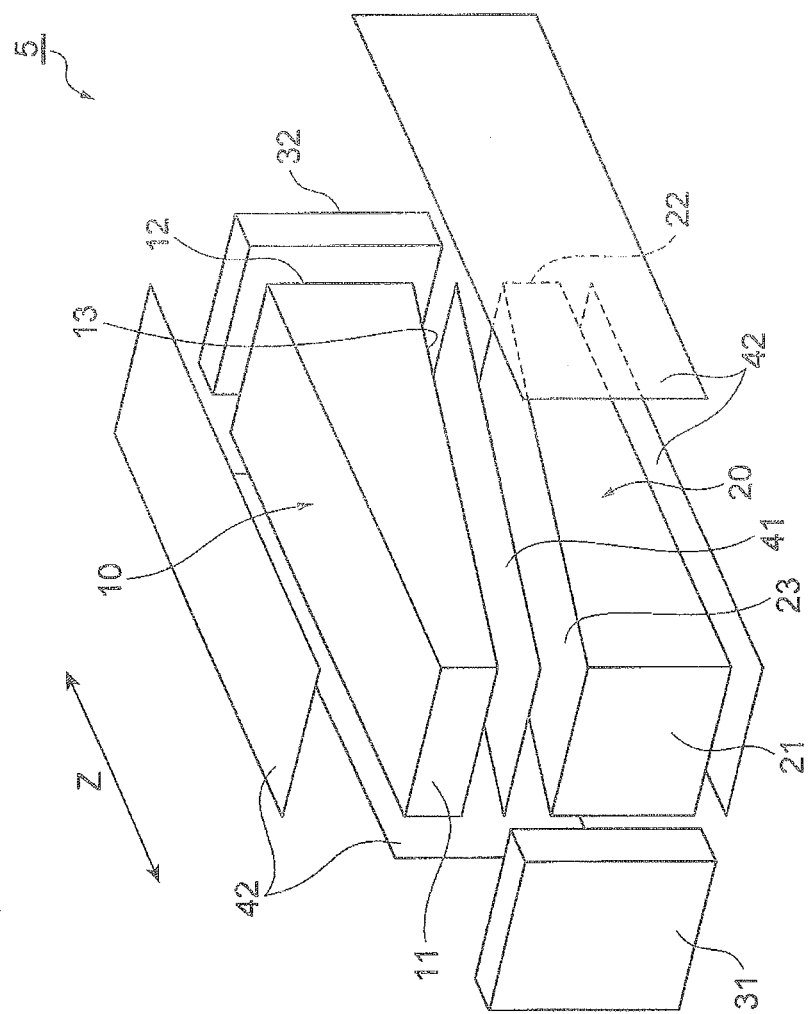
FIG. 3 is an exploded perspective view of a radiation detecting unit in the radiation detector in FIG. 2.
Figure 4:
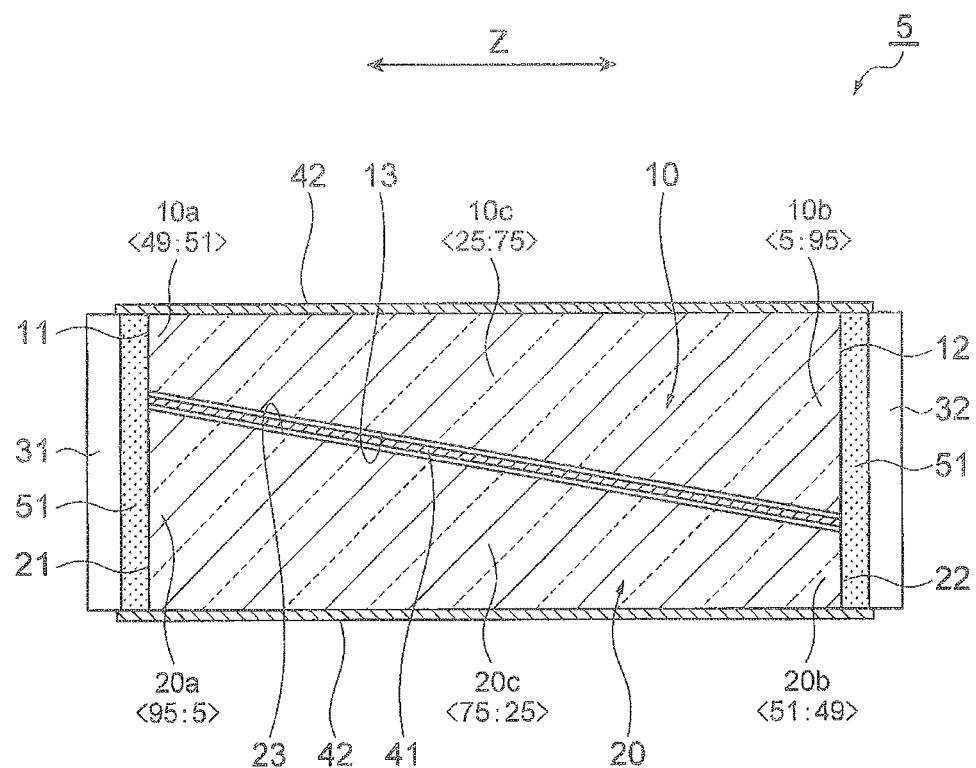
FIG. 4 is a cross-sectional view of the radiation detecting unit in FIG. 3.

Next, the radiation detecting unit 5 will be described in more detail. FIG. 3 is an exploded perspective view of the radiation detecting unit 5 of the radiation detector 2 in FIG. 2. FIG. 4 is a cross-sectional view of the radiation detecting unit 5 in FIG. 3. Note that FIG. 4 is a cross-section of a plane along a predetermined direction Z and a juxtaposing direction of first and second scintillators 10 and 20, to be described later.

As illustrated in FIGS. 3 and 4, the radiation detecting unit 5 includes the first scintillator 10, the second scintillator 20, a first photodetector 31, a second photodetector 32, a first optical reflector (an optical reflector) 41, and a plurality of second optical reflectors 42 (four second optical reflectors in this example).

Each of the first and second scintillators 10 and 20 includes a crystal block that generates scintillation light by a radiation, such as a gamma ray, that has been incident thereon. Each of the first and second scintillators 10 and 20 generates, at each radiation incident position on which each radiation has been incident, each scintillation light with intensity corresponding to a dosage of each radiation that has been incident. The crystal block includes a crystal, such as $Bi_4Ge_3O_{12}$ (BGO), $Lu_2SiO_5$ (LSO) including Ce doped therein, $Lu_{2(1-x)}Y_{2x}SiO_5$ (LYSO), $Gd_2SiO_5$ (GSO), LuAG ($Lu_3Al_5O_{12}$) including Pr doped therein, $LaBr_3$ ($LaBr_3$) including Ce doped therein, $LaCl_3$ ($LaCl_3$) including Ce doped therein, $Lu_{0.7}Y_{0.3}AlO_3$ (LuYAP) including Ce doped therein, or a lutetium fine silicate (LFS).

The first scintillator 10 has, for example, an external form of a wedge shape. More specifically, the first scintillator 10 is long in the predetermined direction Z. The first scintillator 10 has a first end surface 11, a second end surface 12, and a plurality of side surfaces (four side surfaces in the example). The first end surface 11 is positioned on the side of a first end in the predetermined direction Z in the first scintillator 10. The first end surface 11 has a square-shaped plane in the example. The second end surface 12 faces the first end surface 11 and is positioned on the side of a second end in the predetermined direction Z in the first scintillator 10. The second end surface 12 has a square-shaped plane in the example. The first end surface 11 and the second end surface 12 have the predetermined direction Z as a normal direction. An area of the first end surface 11 of the first scintillator 10 is smaller than an area of the second end surface 12 of the first scintillator 10. Respective four side surfaces of the first scintillator 10 are continuous each other through respective sides of the first end surface 11 and respective sides of the second end surface 12. The four side surfaces of the first scintillator 10 have a pair of first side surfaces and second side surfaces. The pair of first side surfaces is parallel to each other and has a trapezoidal-shaped plane in the example. The pair of second side surfaces includes a square-shaped plane and an inclined surface 13 that has a square-shaped plane and inclines to the square-shaped plane in the example. Each of the side surfaces has a plane parallel to the predetermined direction Z.

The second scintillator 20 has, for example, an external form of a wedge shape. The second scintillator 20 has substantially the same shape as the first scintillator 10 has. More specifically, the second scintillator 20 has a first end surface 21, a second end surface 22, and a plurality of side surfaces (four side surfaces in the example). The first end surface 21 is positioned on the side of a first end in the predetermined direction Z in the second scintillator 20. The first end surface 21 has a square-shaped plane in the example. The second end surface 22 faces the first end surface 21 and is positioned on the side of a second end in the predetermined direction Z in the second scintillator 20. The second end surface 22 has a square-shaped plane in the example. The first end surface 21 and the second end surface 22 have a normal direction parallel to the predetermined direction Z. An area of the first end surface 21 of the second scintillator 20 is larger than an area of the second end surface 22 of the second scintillator 20. Respective four side surfaces of the second scintillator 20 are continuous each other through respective sides of the first end surface 21 and respective sides of the second end surface 22. The four side surfaces of the second scintillator 20 have a pair of first side surfaces and a pair of second side surfaces. The pair of first side surfaces is parallel to each other and has a trapezoidal-shaped plane in the example. The pair of second side surfaces includes a square-shaped plane and an inclined surface 23 that has a square-shaped plane and inclines to the square-shaped plane in the example. Each of the side surfaces has a plane parallel to the predetermined direction Z.

The second scintillator 20 is disposed parallel to the first scintillator 10 in a direction intersecting the predetermined direction Z (a direction perpendicular to the predetermined direction Z in this example). In the state, the inclined surface 13 of the first scintillator 10 and the inclined surface 23 of the second scintillator 20 face each other. That is, the inclined surface 13 of the first scintillator 10 is positioned on the side of the second scintillator 20. The inclined surface 23 of the second scintillator 20 is positioned on the side of the first scintillator 10.

The first end surface 11 of the first scintillator 10 and the second end surface 22 of the second scintillator 20 have the same shape and area. The second end surface 12 of the first scintillator 10 and the first end surface 21 of the second scintillator 20 have the same shape and area. In a state where the first and second scintillators 10 and 20 are disposed in parallel (a state in FIG. 4), an entire external form including the first and second scintillators 10 and 20 has a substantially rectangular parallelepiped shape.

The first photodetector 31 is optically coupled to the first end surfaces 11 and 21 through a first optical coupling portion 51. The first photodetector 31 detects each scintillation light emitted from the first end surface 11 of the first scintillator 10 and the first end surface 21 of the second scintillator 20. More specifically, the first photodetector 31 detects intensity of each scintillation light that has been incident on each of the first end surfaces 11 and 21, and outputs a signal corresponding to the intensity of each scintillation light, to the position specifying unit 4. Note that, for example, silicone grease, silicone-based RTV rubber, an adhesive with high transmittance, or an adhesive sheet with high transmittance, is used for the first optical coupling portion 51.

The second photodetector 32 is coupled to the second end surfaces 12 and 22 through a second optical coupling portion 51. The second photodetector 32 detects each scintillation light emitted from the second surface 12 of the first scintillator 10 and the second end surface 22 of the second scintillator 20. More specifically, the second photodetector 32 detects intensity of each scintillation light that has been incident on each of the second end surfaces 12 and 22, and outputs a signal corresponding to the intensity of each scintillation light, to the position specifying unit 4. Note that, for example, silicone grease, silicone-based RTV rubber, an adhesive with high transmittance, or an adhesive sheet with high transmittance, is used for the first optical coupling portion 51.

The first and second photodetectors 31 and 32 are a semiconductor photodetector including, for example, a photomultiplier tube, an avalanche photo diode (APD), or a multi-pixel photon counter (MPPC). Note that the MPPC is a photon counting device including pixels of a plurality of Geiger mode APDs.

The first optical reflector 41 is disposed between the first and second scintillators 10 and 20. More specifically, the first optical reflector 41 is disposed between the inclined surface 13 of the first scintillator 10 and the inclined surface 23 of the second scintillator 20 The four second optical reflectors 42 surround the circumference of the first and second scintillators 10 and 20, the circumference having substantially rectangular parallelepiped shape. The first and second optical reflectors 41 and 42 include a filmy reflective member. Each of surfaces of the first and second optical reflectors 41 and 42 has a mirror finished or diffused reflective surface so as to perform specular or diffuse reflection to scintillation light that has been incident on each of the surfaces. Accordingly, in the first and second scintillators 10 and 20, each of the side surfaces including the inclined surfaces 13 and 23 has a specular or diffuse reflection region. The first and second optical reflectors 41 and 42 includes a material, such as a Teflon tape (Teflon is a registered trademark), a barium sulfate, an aluminum oxide, a titanium oxide, an enhanced specular reflector (ESR) film, or a polyester film.

The position specifying unit 4 specifies each radiation incident position on which each radiation has been incident in each of the first and second scintillators 10 and 20 (namely, an emitting position of the scintillation light) based on each result detected by the first and second photodetectors 31 and 32. More specifically, the position specifying unit 4 acquires a first light quantity that is an amount of the scintillation light incident on the first photodetector 31, and a second light quantity that is an amount of the scintillation light incident on the second photodetector 32. The position specifying unit 4 calculates a distribution ratio regarding a ratio between the first light quantity and the second light quantity (X1:X2) when the sum of the first light quantity and the second light quantity is defined as a reference value. The position specifying unit 4 specifies the emitting position of the scintillation light based on the distribution ratio (X1:X2).

In the position specifying unit 4, a centroid position calculation is used as a method for specifying the emitting position of the scintillation light. Note that the position specifying unit 4 may specify the emitting position of the scintillation light using a method other than the centroid position calculation. For example, a maximum likelihood method may be used. The method for specifying an emitting position of scintillation light will be specifically described below with reference to FIGS. 5 to 10.

Figure 5A:
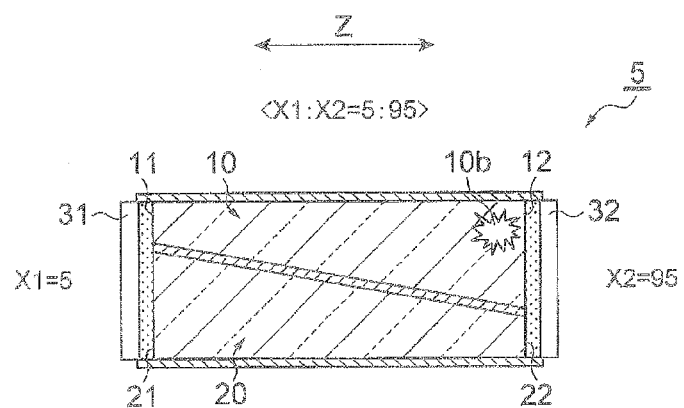
FIG. 5A is a view of an emitting position of scintillation light for describing specification of the emitting position of scintillation light in the radiation detecting unit in FIG. 3.
Figure 5B:
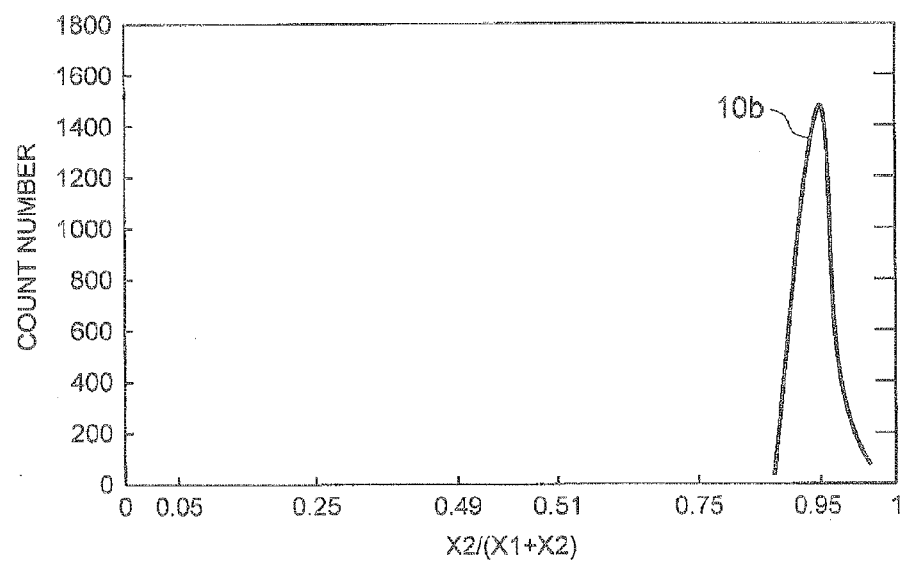
FIG. 5B is a histogram for describing the specification of the emitting position of scintillation light in the radiation detecting unit in FIG. 3.

FIG. 5 illustrates a view and a graphical representation for describing specification of an emitting position when scintillation light is emitted at a second end portion 10b on the side of the second end in the predetermined direction Z in the first scintillator 10. FIG. 5A illustrates the emitting position of the scintillation light. FIG. 5B is a histogram with the vertical axis representing count number and the horizontal axis representing {X2/(X1+X2)=the ratio of the second light quantity/the reference value}. Note that FIGS. 6 to 10 are only different from FIG. 5 in terms of the emitting position of the scintillation light, and have the same figure as in FIG. 5. Therefore, descriptions of, for example, histograms in FIGS. 6 to 10 will be omitted in the following descriptions.

As illustrated in FIG. 5, when the second end portion 10b of the first scintillator 10 corresponds to the emitting position of the scintillation light, a distance between the emitting position and the second end surface 12 is shorter than that between the emitting position and the first end surface 11. The area of the second end surface 12 is larger than the area of the first end surface 11. Therefore, a second light quantity that is incident on the second photodetector 32 is sufficiently larger than a first light quantity that is incident on the first photodetector 31. For example, a distribution ratio regarding the ratio between the first light quantity and the second light quantity (X1:X2) results in X1:X2=5:95. In this case, the count number of the vertical axis has a peak at a position where the value of {X2/(X1+X2)} of the horizontal axis is 0.95 in the histogram. As described above, based on the results detected by the first and second photodetectors 31 and 32, the position specifying unit 4 calculates the distribution ratio (X1:X2) regarding the ratio between the first light quantity and the second light quantity, and specifies the second end portion 10b of the first scintillator 10 as the emitting position of the scintillation light, for example, when the peak of the count number is at $\{X2/(X1+X2)\}=0.95$.

Figure 6A:
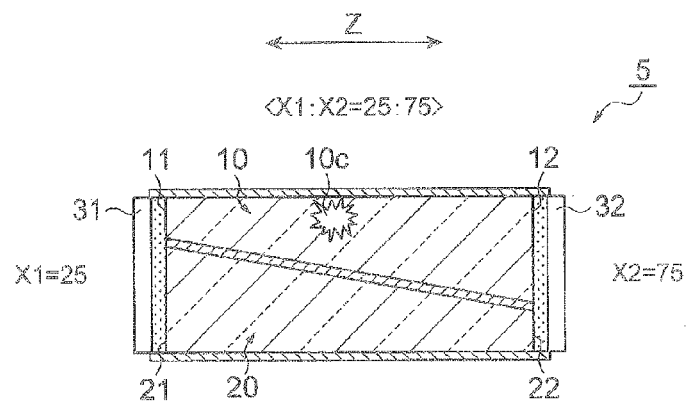
FIG. 6A is a view of an emitting position of scintillation light for describing specification of the emitting position of scintillation light in the radiation detecting unit in FIG. 3.
Figure 6B:
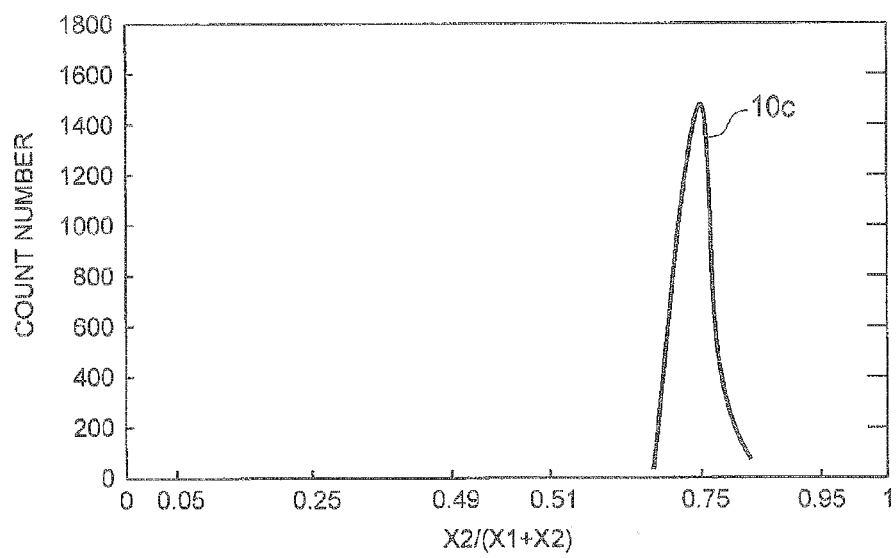
FIG. 6B is a histogram for describing the specification of the emitting position of scintillation light in the radiation detecting unit in FIG. 3.

FIG. 6 illustrates a method for specifying an emitting position when scintillation light is emitted at a middle portion 10c in the predetermined direction Z in the first scintillator 10. In this case, a distance between the emitting position of the scintillation light and the first end surface 11 and a distance between the emitting position of the scintillation light and the second end surface 12 are substantially the same. However, the area of the second end surface 12 is larger than the area of the first end surface 11. Therefore, the second light quantity that is incident on the second photodetector 32 is larger than the first light quantity that is incident on the first photodetector 31 (however, the second light quantity is smaller than that in a case where the scintillation light is emitted at the second end portion 10b). For example, the distribution ratio (X1:X2) regarding the ratio between the first light quantity and the second light quantity results in X1:X2=25:75. In this case, the count number of the vertical axis has a peak at a position where the value of $\{X2/(X1+X2)\}$ of the horizontal axis is 0.75 in the histogram. As described above, based on the results detected by the first and second photodetectors 31 and 32, the position specifying unit 4 calculates the distribution ratio (X1:X2) regarding the ratio between the first light quality and the second light quality, and specifies the middle portion 10c of the first scintillator 10 as the emitting position of the scintillation light, for example, when the count number has a peak at $\{X2/(X1+X2)\}=0.75$.

Figure 7A:
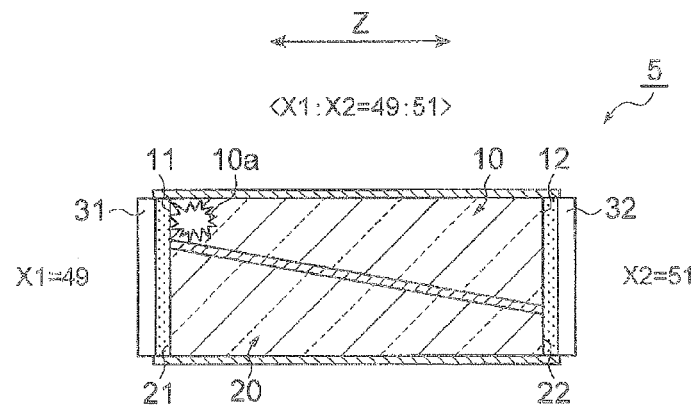
FIG. 7A is a view of an emitting position of scintillation light for describing specification of the emitting position of scintillation light in the radiation detecting unit in FIG. 3.
Figure 7B:
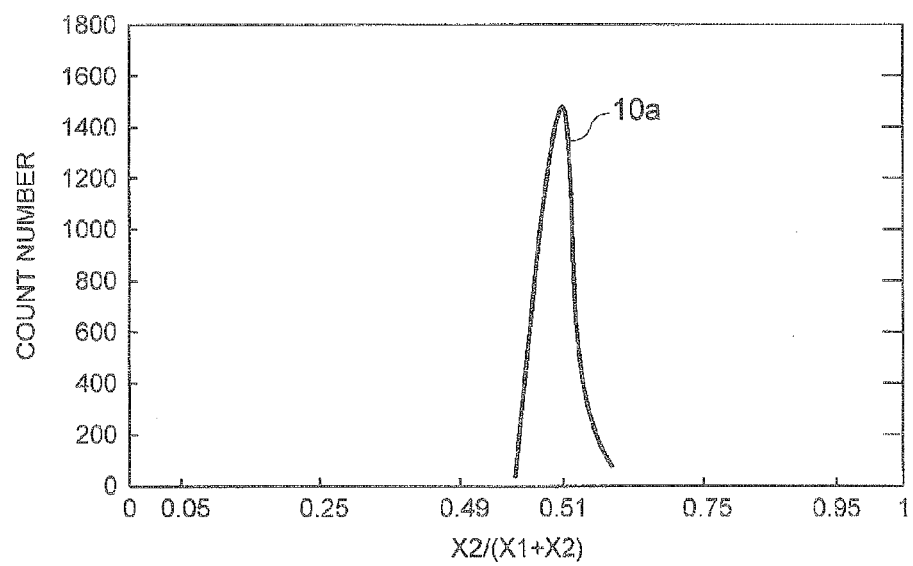
FIG. 7B is a histogram for describing the specification of the emitting position of scintillation light in the radiation detecting unit in FIG. 3.

FIG. 7 illustrates a method for specifying an emitting position when scintillation light is emitted at a first end portion 10a on the side of the first end in the predetermined direction Z in the first scintillator 10. In this case, a distance between the emitting position of the scintillation light and the second end surface 12 is longer than a distance between the emitting position of the scintillation and the first end surface 11. However, the area of the second end surface 12 is larger than the area of the first end surface 11. Therefore, the second light quantity that is incident on the second photodetector 32 is slightly larger than the first light quantity that is incident on the first photodetector 31 (however, the second light quantity is smaller than that in a case where the scintillation light is emitted at the middle portion 10c). For example, the distribution ratio (X1:X2) regarding the ratio between the first light quantity and the second light quantity results in X1:X2=49:51(A:B). Therefore, the count number of the vertical axis has a peak at a position where the value of $\{X2/(X1+X2)\}$ of the horizontal axis is 0.51 in the histogram. As described above, based on the results detected by the first and second photodetectors 31 and 32, the position specifying unit 4 calculates the distribution ratio (X1:X2) regarding the ratio between the first light quantity and the second light quantity, and specifies the first end portion 10a of the first scintillator 10 as the emitting position of the scintillation light, for example, when the count number has a peak at $\{X2/(X1+X2)\}=0.51$.

Figure 8A:
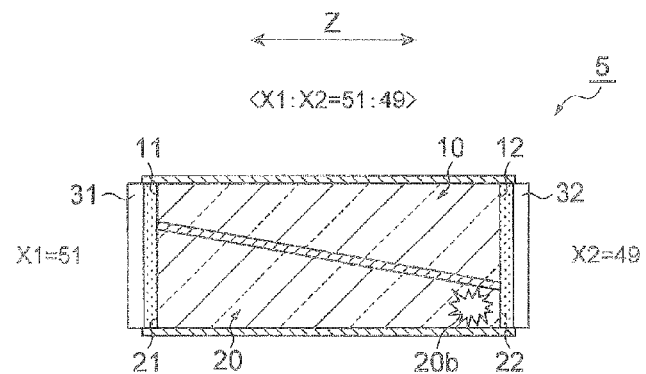
FIG. 8A is a view of an emitting position of scintillation light for describing specification of the emitting position of scintillation light in the radiation detecting unit in FIG. 3.
Figure 8B:
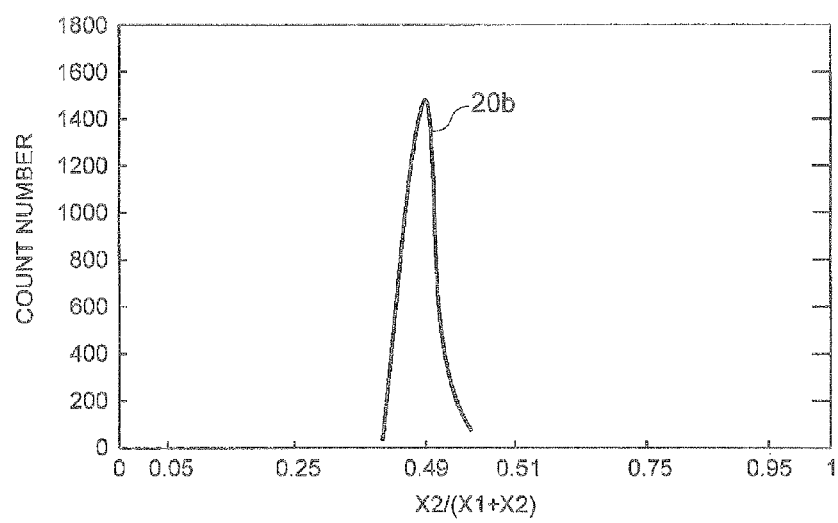
FIG. 8B is a histogram for describing the specification of the emitting position of scintillation light in the radiation detecting unit in FIG. 3.

FIG. 8 illustrates a method for specifying an emitting position when scintillation light is emitted at a second end portion 20b on the side of a second end in the predetermined direction Z in the second scintillator 20. In this case, a distance between the emitting position of the scintillation light and the second end surface 22 is shorter than a distance between the emitting position of the scintillation light and the first end surface 21. The area of the second end surface 22 is smaller than the area of the first end surface 21. Therefore, the second light quantity that is incident on the second photodetector 32 is slightly smaller than the first light quantity that is incident on the first photodetector 31. For example, the distribution ratio (X1:X2) regarding the ratio between the first light quantity and the second light quantity results in X1:X2=51:49(C:D). Therefore, the count number of the vertical axis has a peak at a position where the value of $\{X2/(X1+X2)\}$ of the horizontal axis is 0.49 in the histogram. As described above, based on the results detected by the first and second photodetectors 31 and 32, the position specifying unit 4 calculates the distribution ratio (X1:X2) regarding the ratio between the first light quantity and the second light quantity, and specifies the second end portion 20b of the second scintillator 20 as the emitting position of the scintillation light, for example, when the count number has a peak at $\{X2/(X1+X2)\}=0.49$.

Figure 9A:
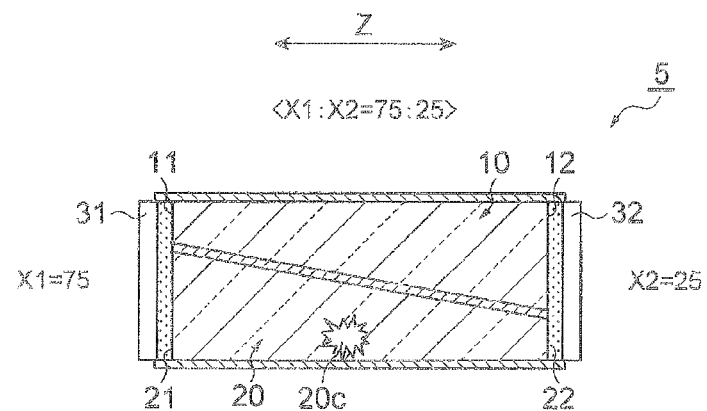
FIG. 9A is a view of an emitting position of scintillation light for describing specification of the emitting position of scintillation light in the radiation detecting unit in FIG. 3.
Figure 9B:
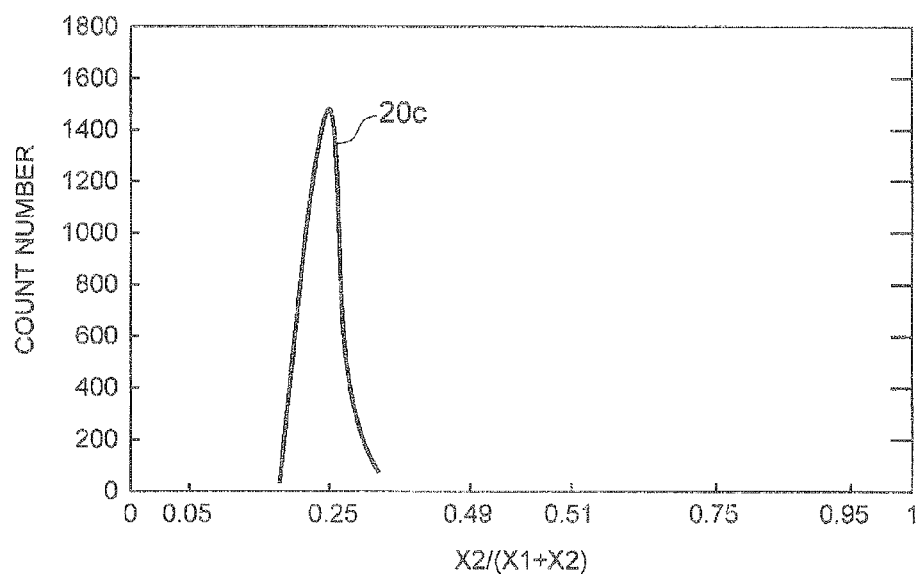
FIG. 9B is a histogram for describing the specification of the emitting position of scintillation light in the radiation detecting unit in FIG. 3.

FIG. 9 illustrates a method for specifying an emitting position when scintillation light is emitted at a middle portion 20c in the predetermined direction Z in the second scintillator 20. In this case, a distance between the emitting position of the scintillation light and the first end surface 21 and a distance between the emitting position of the scintillation light and the second end surface 22 are substantially the same. The area of the second end surface 22 is smaller than the area of the first end surface 21. Therefore, the second light quantity that is incident on the second photodetector 32 is smaller than the first light quantity that is incident on the first photodetector 31 (the second light quantity is further smaller than that in a case where the scintillation light is emitted at the second end portion 20b). For example, the distribution ratio (X1:X2) regarding the ratio between the first light quantity and the second light quantity results in X1:X2=75:25. Therefore, the count number of the vertical axis has a peak at a position where the value of $\{X2/(X1+X2)\}$ of the horizontal axis is 0.25 in the histogram. As described above, based on the results detected by the first and second photodetectors 31 and 32, the position specifying unit 4 calculates the distribution ratio (X1:X2) regarding the ratio between the first light quantity and the second light quantity, and specifies the middle portion 20c of the second scintillator 20 as the emitting position of the scintillation light, for example, when the count number has a peak at $\{X2/(X1+X2)\}=0.25$.

Figure 10A:
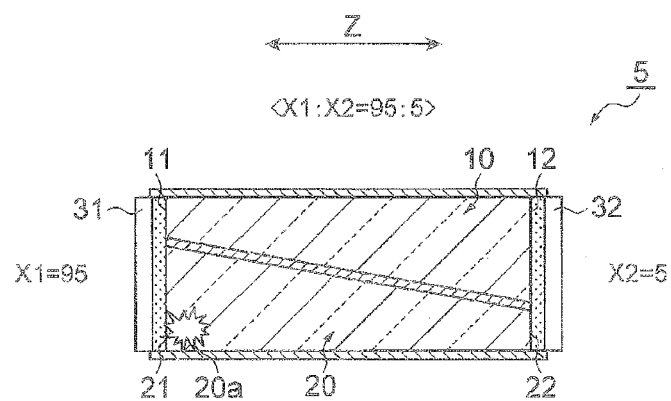
FIG. 10A is a view of an emitting position of scintillation light for describing specification of the emitting position of scintillation light in the radiation detecting unit in FIG. 3.
Figure 10B:
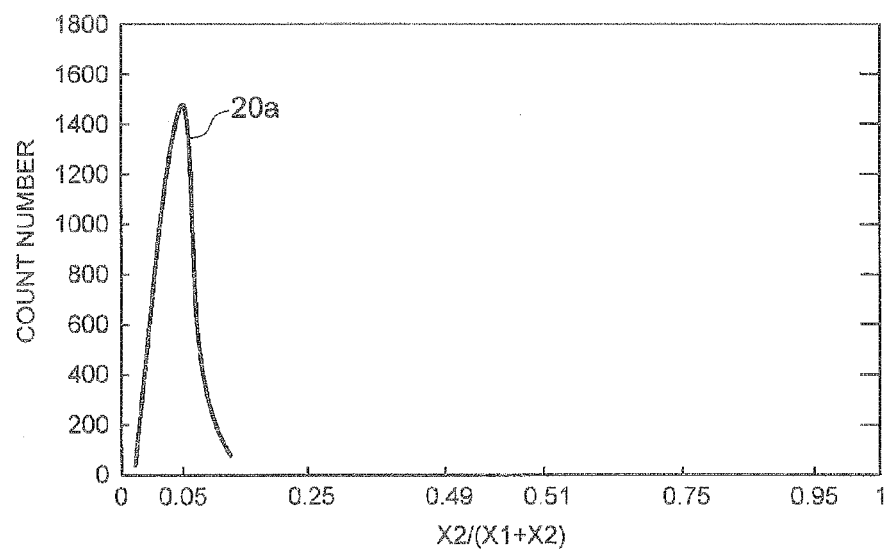
FIG. 10B is a histogram for describing the specification of the emitting position of scintillation light in the radiation detecting unit in FIG. 3.

FIG. 10 illustrates a method for specifying an emitting position when scintillation light is emitted at a first end portion 20a on the side of the first end in the predetermined direction Z in the second scintillator 20. In this case, a distance between the emitting position of the scintillation light and the second end surface 22 is longer than a distance between the emitting position of the scintillation light and the first end surface 21. Furthermore, the area of the second end surface 22 is smaller than the first end surface 21. Therefore, the second light quantity that is incident on the second photodetector 32 is sufficiently smaller than the first light quantity that is incident on the first photodetector 31 (the second light quantity is further smaller than that in a case where the scintillation light is emitted at the middle portion 20c). For example, the distribution ratio (X1:X2) regarding the ratio between the first light quantity and the second light quantity results in X1:X2=95:5. Therefore, the count number of the vertical axis has a peak at a position where the value of $\{X2/(X1+X2)\}$ of the horizontal axis is 0.05 in the histogram. As described above, based on the results detected by the first and second photodetectors 31 and 32, the position specifying unit 4 calculates the distribution ratio (X1:X2) regarding the ratio between the first light quantity and the second light quantity, and specifies the first end portion 20a of the second scintillator 20 as the emitting position of the scintillation light, for example, when the count number has a peak at $\{X2/(X1+X2)\}=0.05$.

The position specifying unit 4 specifies an emitting position of scintillation light, namely, a radiation incident position by the above methods. It can be said the following regarding the distribution ratio (X1:X2) in each of the first and second scintillator 10 and 20 according to the present embodiment.

(i) The distribution ratio (X1:X2) when the emission occurs at the first end portion 10a on the side of the first end in the predetermined direction Z in the first scintillator 10 (X1:X2=49:51), the distribution ratio (X1:X2) when the emission occurs at the second end portion 10b on the side of the second end in the predetermined direction Z in the first scintillator 10 (X1:X2=5:95), and the distribution ratio (X1: X2) when the emission occurs at the middle portion 10c in the predetermined direction Z in the first scintillator 10 (X1:X2=25:75), are different from each other.

(ii) The distribution ratio (X1:X2) in a case where the emission occurs at the first end portion 20a on the side of the first end in the predetermined direction Z in the second scintillator 20 (X1:X2=95:5), the distribution ratio (X1:X2) in a case where the emission occurs at the second end portion 20b on the side of the second end in the predetermined direction Z in the second scintillator 20 (X1:X2=51: 49), and the distribution ratio (X1:X2) in a case where the emission occurs at the middle portion 20c in the predetermined direction Z in the second scintillator 20 (X1:X2=75: 25), are different from each other.

(iii) When the distribution ratio (X1:X2) in the case where the emission occurs at the first end portion 10a in the first scintillator 10 is defined as A:B (=49:51), and when the distribution ratio (X1:X2) in the case where the emission occurs at the second end portion 20b in the second scintillator 20 is defined as C:D (=51:49), A<C and B>D are satisfied.

According to the present embodiment, between the first and second photodetectors 31 and 32, the first and second scintillators 10 and 20 are disposed in parallel in the direction intersecting the predetermined direction Z (the direction perpendicular to the predetermined direction Z in the example). Therefore, there are scintillators divided into two or more in the direction intersecting the predetermined direction Z (two in the example). As a result, without an increase of the number of photodetectors, sampling density can be improved so that spatial resolution of the radiation incident position can be improved. Note that the sampling density stated herein indicates the number of measuring points per unit space capable of specifying an incident position. Therefore, information on an object to be measured can be captured in detail as the sampling density increases (improves). Since a width in the juxtaposing direction of the scintillators decreases, the spatial resolution also improves.

The area of the first end surface 11 of the first scintillator 10 and the area of the first end surface 21 of the second scintillator 20 are different from the area of the second end surface 12 of the first scintillator 10 and the area of the second end surface 22 of the second scintillator 20, respectively. The area of the first end surface 11 of the first scintillator 10 is smaller than the area of the second end surface 12 of the first scintillator 10. The area of the first end surface 21 of the second scintillator 20 is larger than the area of the second end surface 22 of the second scintillator 20. Accordingly, when each of the radiations is incident on each of the first and second scintillators 10 and 20, an amount of each scintillation light that is incident on each of the first and second photodetectors 31 and 32 (namely, the first and second light quantities) can be differentiated in accordance with the radiation incident position in the predetermined direction Z. Based on the difference between the first and second light quantities, the position specifying unit 4 can specify each of the radiation incident positions in the predetermined direction Z in each of the first and second scintillators 10 and 20. As described above, the radiation detector 2 can accurately specify the radiation incident position.

According to the present embodiment, when the distribution ratio (X1:X2) is defined as A:B (=49:51) in the case where the emission occurs at the first end portion 10a in the first scintillator 10 and the distribution ratio (X1:X2) is defined as C:D (=51:49) in the case where the emission occurs at the second portion 20b in the second scintillator 20, A<C and B>D are satisfied. Accordingly, in the respective end portions 10a and 10b in the first scintillator 10 and the respective portions 20a and 20b in the second scintillator 20, in a case where each scintillation light is emitted by each of the incident radiations, the distribution ratio (X1:X2) can be securely differentiated in accordance with the respective end portions 10a, 10b, 20a, and 20b. Accordingly, the radiation detector 2 can securely specify the radiation incident position.

According to the present embodiment, the first and second scintillators 10 and 20 have the inclined surfaces 13 and 23 that incline to a plane parallel to the predetermined direction Z, respectively. Accordingly, the number of reflection of the scintillation light emitted by the incident radiation in the first scintillator 10 until the scintillation light reaches each of the end surfaces 11 and 12, is inhibited. The number of reflection of the scintillation light emitted by the incident radiation in the second scintillator 20 until the scintillation light reaches each of the end surfaces 21 and 22, is inhibited. As a result, the scintillation light in the first scintillator 10 is promptly guided to each of the end surface 11 and 12. The scintillation light in the second scintillator 20 is promptly guided to each of the end surfaces 21 and 22. Since the number of the reflection is inhibited, each arrival time of the scintillation light that reaches the first photodetector 31 and the scintillation light that reaches the second photodetector 32, shortens and each variation is also inhibited. Since each detecting time of the photodetectors differs depending on a position where the radiation is detected in the scintillator, a variation of each detecting time caused by the detecting position can be accurately corrected using detecting position information. Accordingly, in the PET apparatus 1 (for example, a TOF-PET apparatus), accuracy for measuring a time difference detected by the pair of radiation detectors 2, namely, time resolution (a time characteristic) can be improved.

According to the present embodiment, the radiation detector 2 includes the first optical reflector 41 disposed between the first and second scintillators 10 and 20. Accordingly, scintillation light emitted by an incident radiation in one scintillator is inhibited from leaking into the other scintillator. Scintillation light emitted in the first scintillator 10 is securely guided to the end surfaces 11 and 12, and scintillation light emitted in the second scintillator 20 is securely guided to the end surfaces 21, and 22.

Second Embodiment

Next, a second embodiment will be described. In the descriptions of the present embodiment, points different from the first embodiment will be described and the duplicate descriptions will be omitted.

FIG. 11 is a side view of a radiation detecting unit 105 in a radiation detector according to the second embodiment. The radiation detecting unit 105 is different from the radiation detecting unit 5 in the first embodiment in that the radiation detecting unit 105 includes a first, second and third scintillators 110, 120, and 130.

The first scintillator 110 has, for example, an external form of a wedge shape. More specifically, the first scintillator 110 is long in the predetermined direction Z. The first scintillator 110 has a first end surface 111, a second end surface 112, and a plurality of side surfaces (four side surfaces in the example). The first end surface 111 is positioned on the side of a first end in the predetermined direction Z in the first scintillator 110. The first end surface 111 has a square-shaped plane in the example. The second end surface 112 faces the first end surface 111 and is positioned on the side of a second end in the predetermined direction Z in the first scintillator 110. The second end surface 112 has a square-shaped plane in the example. The first end surface 111 and the second end surface 112 have a normal direction parallel to the predetermined direction Z. An area of the first end surface 111 of the first scintillator 110 is smaller than an area of the second end surface 112 of the first scintillator 110. Respective four side surfaces of the first scintillator 110 are continuous each other through respective sides of the first end surface 111 and respective sides of the second end surface 112. The four side surfaces of the first scintillator 110 have a pair of first side surfaces and a pair of a second side surfaces. The pair of first side surfaces is parallel to each other and has a trapezoidal-shaped plane in the example. The pair of second side surfaces includes a square-shaped plane and an inclined surface 113 that has a square-shaped plane and inclines to the square-shaped plane in the example. Each of the side surfaces has a plane parallel to the predetermined direction Z.

The second scintillator 120 has, for example, an external form of a wedge shape. The second scintillator 120 has substantially the same shape as the first scintillator 110 has. More specifically, the second scintillator 120 has a first end surface 121, a second end surface 122, and a plurality of side surfaces (four side surfaces in the example). The first end surface 121 is positioned on the side of a first end in the predetermined direction Z in the second scintillator 120. The first end surface 121 has a square-shaped plane in the example. The second end surface 122 faces the first end surface 121 and is positioned on the side of a second end in the predetermined direction Z in the second scintillator 120. The second end surface 122 has a square-shaped plane in the example. The first end surface 121 and the second end surface 122 have a normal direction parallel to the predetermined direction Z. An area of the first end surface 121 of the second scintillator 120 is larger than an area of the second end surface 122 of the second scintillator 120. Respective four side surfaces of the second scintillator 120 are continuous each other through respective sides of the first end surface 121 and respective sides of the second end surface 122. The four side surfaces of the second scintillator 120 have a pair of first side surfaces and a pair of second side surfaces. The pair of first side surfaces is parallel to each other and has a trapezoidal-shaped plane in the example. The pair of second side surfaces includes a square-shaped plane and an inclined surface 123 that has a square-shaped plane and inclines to the square-shaped plane in the example. Each of the side surfaces has a plane parallel to the predetermined direction Z.

The third scintillator 130 is disposed in parallel between the first and second scintillators 110 and 120. The third scintillator 130 has, for example, an external form of a square pole shape having side surfaces of a parallelogram shape. More specifically, the third scintillator 130 has a first end surface 131, a second end surface 132, and a plurality of side surfaces (four side surfaces in the example). The first end surface 131 is positioned on the side of a first end in the predetermined direction Z in the third scintillator 131. The first end surface 131 has a square-shaped plane in the example. The second end surface 132 faces the first end surface 131 and is positioned on the side of a second end in the predetermined direction Z in the third scintillator 130. The second end surface 132 has a square-shaped plane in the example.

An area of the first end surface 131 of the third scintillator 130 is larger than the area of the first end surface 111 of the first scintillator 110 and is smaller than the area of the first end surface 121 of the second scintillator 120. An area of the second end surface 132 of the third scintillator 130 is smaller than the area of the second end surface 112 of the first scintillator 110 and is larger than the area of the second end surface 122 of the second scintillator 120. The first end surface 131 and the second end surface 132 of the third scintillator 130 have the same shape and area.

Four side surfaces of the third scintillator 130 are continuous each other through respective sides of the first end surface 131 and respective sides of the second end surface 132. The four side surfaces of the third scintillator 130 have a pair of first side surfaces and a pair of second side surfaces. The pair of first side surfaces is parallel to each other and has the parallelogram-shaped plane in the example. The pair of second side surfaces is inclined surfaces 133 and 134 that are a square-shaped plane and face the inclined surface 113 of the first scintillator 110 and the inclined surface 123 of the second scintillator 120, respectively. In a state where the third scintillator 130 is disposed between the first and second scintillators 110 and 120, the inclined surfaces 133 and 134 incline parallel to the inclined surfaces 113 and 123.

A width in a direction that is perpendicular to the predetermined direction Z, and in which the first, second, and third scintillators 110, 120, and 130 are in parallel (in a juxtaposing direction of the respective scintillators), is substantially the same as the width in the juxtaposing direction of the first and second scintillators 10 and 20 according to the first embodiment. In other words, a width of the first end surface 111 of the first scintillator 110 and a width of the first end surface 121 of the second scintillator 120 in the juxtaposing direction according to the present embodiment are smaller than a width of the first end surface 11 of the first scintillator 10 and a width of the first end surface 21 of the second scintillator 20 in the juxtaposing direction according to the first embodiment, respectively. A width of the second end surface 112 of the first scintillator 110 and a width of the second end surface 122 of the second scintillator 120 in the juxtaposing direction are smaller than a width of the second end surface 12 of the first scintillator 10 and a width of the second end surface 22 of the second scintillator 20 in the juxtaposing direction according to the first embodiment, respectively. In a state where the first, second, and third scintillators 110, 120, and 130 are disposed in parallel (a state in FIG. 11), an entire external form including the first, second, and third scintillators 110, 120, and 130 has a substantially rectangular parallelepiped shape that has substantially the same size as an entire external form of the first and second scintillators 10 and 20 (refer to FIG. 4).

A first photodetector 31 detects each scintillation light emitted from the first end surface 111 of the first scintillator 110, the first end surface 121 of the second scintillator 120, and the first end surface 131 of the third scintillator 130. The first photodetector 31 is optically coupled to the first end surface 111 of the first scintillator 110, the first end surface 121 of the second scintillator 120, and the first end surface 131 of the third scintillator 130 through a first optical coupling portion 51. A second photodetector 32 detects each scintillation light from the second end surface 112 of the first scintillator 110, the second end surface 122 of the second scintillator 120, and the second end surface 132 of the third scintillator 130. The second photodetector 32 is optically coupled to the second end surface 112 of the first scintillator 110, the second end surface 122 of the second scintillator 120, and the second end surface 132 of the third scintillator 130 through a second optical coupling portion 51. For example, silicone grease, silicone-based RTV rubber, an adhesive with high transmittance, or an adhesive sheet with high transmittance, is used for the first and second optical coupling portions 51. A first optical reflector 41 is further disposed between the first and third scintillators 110 and 130. Another first optical reflector 41 is further disposed between the second and third scintillators 120 and 130.

The position specifying unit 4 specifies each radiation incident position on which each radiation has been incident in each of the first, second, and third scintillators 110, 120, and 130 (an emitting position of the scintillation light) based on the results detected by the first and second photodetectors 31 and 32. A method for specifying a radiation incident position will be specifically described below with reference to FIG. 12.

Figure 12A:
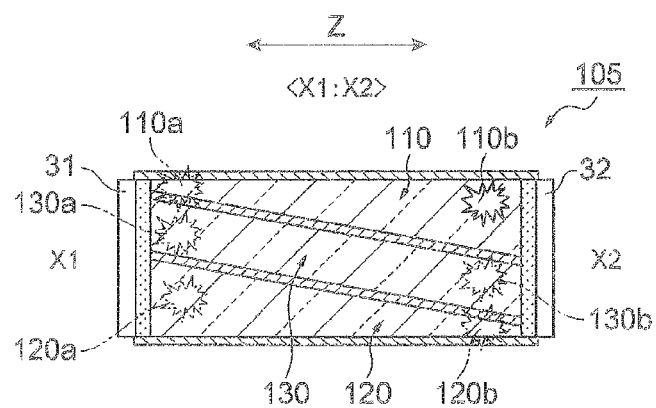
FIG. 12A is a view of an emitting position of scintillation light for describing specification of the emitting position of scintillation light in the radiation detecting unit in the radiation detector in FIG. 11.
Figure 12B:
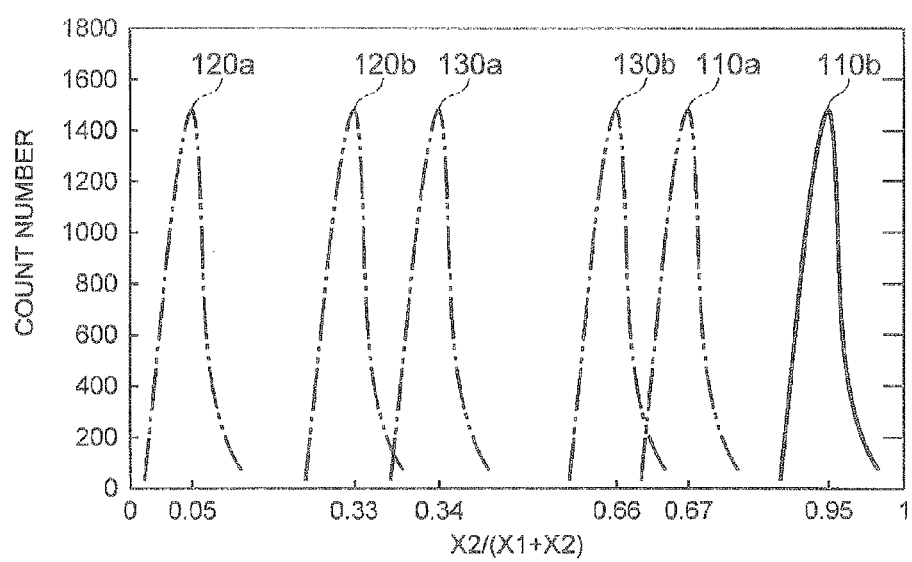
FIG. 12B is a histogram for describing the specification of the emitting position of scintillation light in the radiation detecting unit in the radiation detector in FIG. 11.

FIG. 12 illustrates a view and a graphical representation for describing specification of each emitting position when each scintillation light is emitted in each of the first, second, and third scintillators 110, 120, and 130. FIG. 12A illustrates the emitting position of the scintillation light. FIG. 12B is a histogram with the vertical axis representing count number and the horizontal axis representing $\{X2/(X1+X2)\}$.

When a second end portion 110b of the first scintillator 110 corresponds to the emitting position, a distribution ratio (X1:X2) regarding a ratio between a first light quantity and a second light quantity results in, for example, X1:X2=5:95 (refer to FIG. 11). Therefore, the count number has a peak at a position where the value of the horizontal axis is 0.95 in the histogram. As described above, based on the results detected by the first and second photodetectors 31 and 32, the position specifying unit 4 calculates the distribution ratio (X1:X2) regarding the ratio between the first light quantity and the second light quantity, and specifies the second end portion 10b of the first scintillator 10 as the emitting position of the scintillation light, for example, when the peak of the count number is at $\{X2/(X1+X2)\}=0.95$.

When a first end portion 110a of the first scintillator 110 corresponds to the emitting position, a distribution ratio (X1:X2) regarding a ratio between a first light quantity and a second light quantity results in, for example, X1:X2=33:67 (A:B) (refer to FIG. 11). Therefore, the count number has a peak at a position where the value of the horizontal axis is 0.67 in the histogram. As described above, based on the results detected by the first and second photodetectors 31 and 32, the position specifying unit 4 calculates the distribution ratio (X1:X2) regarding the ratio between the first light quantity and the second light quantity, and specifies the first end portion 110a of the first scintillator 110 as the emitting position of the scintillation light, for example, when the count number has the peak at $\{X2/(X1+X2)\}=0.67$.

When a second end portion 130b on the side of a second end of the third scintillator 130 corresponds to the emitting position, the distribution ratio (X1:X2) regarding the ratio between the first light quantity and the second light quantity results in, for example, X1:X2=34:66 (G:H) (refer to FIG. 11). Therefore, the count number has a peak at a position where the value of the horizontal axis is 0.66 in the histogram. As described above, based on the results detected by the first and second photodetectors 31 and 32, the position specifying unit 4 calculates the distribution ratio (X1:X2) regarding the ratio between the first light quantity and the second light quantity, and specifies the second end portion 130b of the third scintillator 130 as the emitting position of the scintillation light, for example, when the count number has the peak at $\{X2/(X1+X2)\}=0.66$.

When a first end portion 130a on the side of a first end of the third scintillator 130 corresponds to the emitting position, the distribution ratio (X1:X2) regarding the ratio between the first light quantity and the second light quantity results in, for example, X1:X2=66:34 (E:F) (refer to FIG. 11). Therefore, the count number has a peak at a position where the value of the horizontal axis is 0.34 in the histogram. As described above, based on the results detected by the first and second photodetectors 31 and 32, the position specifying unit 4 calculates the distribution ratio (X1:X2) regarding the ratio between the first light quantity and the second light quantity, and specifies the first end portion 130a of the third scintillator 130 as the emitting position of the scintillation light, for example, when the count number has the peak at $\{X2/(X1+X2)\}=0.34$.

When a second end portion 120b of the second scintillator 120 corresponds to the emitting position, the distribution ratio (X1:X2) regarding the ratio between the first light quantity and the second light quantity results in, for example, X1:X2=67:33 (C:D) (refer to FIG. 11). Therefore, the count number has a peak at a position where the value of the horizontal axis is 0.33 in the histogram. As described above, based on the results detected by the first and second photodetectors 31 and 32, the position specifying unit 4 calculates the distribution ratio (X1:X2) regarding the ratio between the first light quantity and the second light quantity, and specifies the second end portion 120b of the second scintillator 120 as the emitting position of the scintillation light, for example, when the count number has the peak at $\{X2/(X1+X2)\}=0.33$.

When a first end portion 120a of the second scintillator 120 corresponds to the emitting position, the distribution ratio (X1:X2) regarding the ratio between the first light quantity and the second light quantity results in, for example, X1:X2=95:5 (refer to FIG. 11). Therefore, the count number has a peak at a position where the value of the horizontal axis is 0.05 in the histogram. As described above, based on the results detected by the first and second photodetectors 31 and 32, the position specifying unit 4 calculates the distribution ratio (X1:X2) regarding the ratio between the first light quantity and the second light quantity, and specifies the first end portion 120a of the second scintillator 120 as the emitting position of the scintillation light, for example, when the count number has the peak at $\{X2/(X1+X2)\}=0.05$.

The position specifying unit 4 specifies the emitting position of the scintillation light, namely, the radiation incident position by the above method. In addition to the descriptions according to the first embodiment, it can be further said the following about the distribution ratio (X1:X2) regarding the ratio between the first light quantity and the second light quantity when the sum of the first light quantity that is an amount of light incident on the first photodetector 31 and the second light quantity that is an amount of light incident on the second photodetector 32 is defined as a reference value.

(iv) The distribution ratio (X1:X2) when the emission occurs at the first end portion 130a on the side of the first end in the predetermined direction Z in the third scintillator 130 (X1:X2=66:34) is mutually different from the distribution ratio (X1:X2) when the emission occurs at the second end portion 130b on the side of the second end in the predetermined direction Z in the third scintillator 130 (X1:X2=34:66).

(v) When the distribution ratio (X1:X2) is defined as A:B (33:67) when the emission occurs at the first end portion 110a of the first scintillator 110, the distribution ratio (X1:X2) is defined as C:D (=67:33) when the emission occurs at the second end portion 120b of the second scintillator 120, the distribution ratio (X1:X2) is defined as E:F (=66:34) when the emission occurs at the first end portion 130a of the third scintillator 130, and the distribution ratio (X1:X2) is defined as G:H (=34:66) when the emission occurs at the second end portion 130b of the third scintillator 130, A<G<E<C and B>H>F>D are satisfied.

According to the present embodiment, the above effect, namely, an effect that can accurately specify the radiation incident position without an increase of the number of photodetectors, is obtained. According to the present embodiment, the third scintillator 130 is further disposed in parallel between the first and second scintillators 110 and 120. Accordingly, between the first and second photodetectors 31 and 32, the first, second, and third scintillators 110, 120, and 130 are disposed in parallel in a direction intersecting the predetermined direction Z. As a result, sampling density can be further improved and spatial resolution can be also further improved. In particular, the width of the first, second, and third scintillators 110, 120, and 130 in the juxtaposing direction is substantially the same as the width in the juxtaposing direction of the first and second scintillators 10 and 20 according to the first embodiment. The width of each of the first, second, and third scintillators 110, 120, and 130 in the juxtaposing direction is narrower than that of each of the scintillators according to the first embodiment. Therefore, the above spatial resolution is securely improved when compared with the first embodiment. Note that the number of scintillators disposed in the juxtaposing direction between the first and second photodetectors 31 and 32 may be four or more.

According to the present embodiment, the area of the first end surface 131 of the third scintillator 130 is larger than the area of the first end surface 111 of the first scintillator 110 and is smaller than the area of the first end surface 121 of the second scintillator 120. Furthermore, the area of the second end surface 132 of the third scintillator 130 is smaller than the area of the second end surface 112 of the first scintillator 110 and is larger than the area of the second end surface 122 of the second scintillator 120. Accordingly, an amount of each light incident on each of the first and second photodetectors 31 and 32 can be differentiated in accordance with the radiation incident position in the predetermined direction Z in each of the first, second, and third scintillators 110, 120, and 130. The radiation incident position in the predetermined direction Z can be specified.

According to the present embodiment, when the distribution ratio (X1:X2) is defined as A:B (=33:67) when the emission occurs at the first end portion 110a of the first scintillator 110, the distribution ratio (X1:X2) is defined as C:D (=67:33) when the emission occurs at the second end portion 120b of the second scintillator 120, the distribution ratio (X1:X2) is defined as E:F (=66:34) when the emission occurs at the first end portion 130a of the third scintillator 130, and the distribution ratio (X1:X2) is defined as G:H (=34:66) when the emission occurs at the second end portion 130b of the third scintillator 130, A<G<E<C and B>H>F>D are achieved.

Accordingly, when each scintillation light is emitted, due to each of the incident radiations, in each of the end portions 110a and 110b of the first scintillator 110, the end portions 120a and 120b of the second scintillator 120, and the end portions 130a and 130b of the third scintillator 130, the distribution ratio (X1:X2) can be securely differentiated in accordance with each of the end portions 110a, 110b, 120a, 120b, 130a, and 130b. The configuration including the first, second, and third scintillators 110, 120, and 130 can securely specify the radiation incident position.

Preferred embodiments have been described. However, the present invention is not limited to the above embodiments. The present invention may include a modification without changing the spirit described in each claim, or an application to others.

Figure 13A:
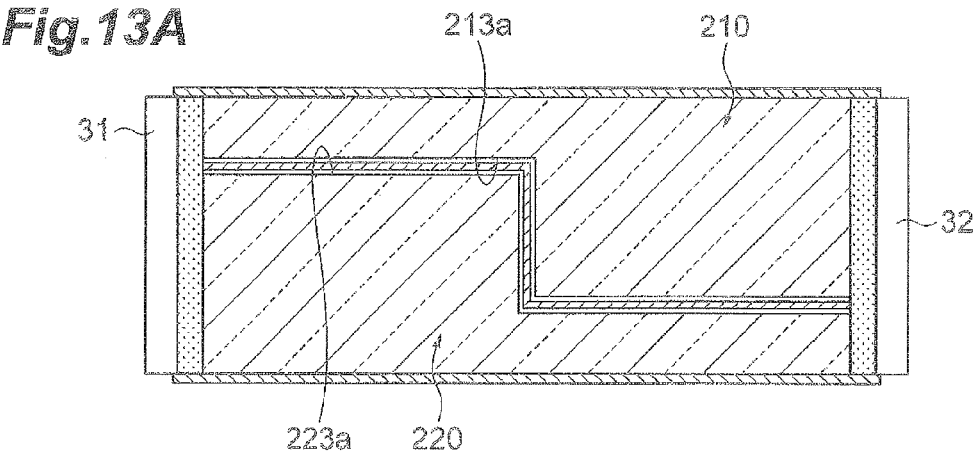
FIG. 13A is a cross-sectional view of a radiation detecting unit according to a first modification.

According to the above embodiments, each of the side surfaces of the first scintillators 10 and 110 and the second scintillators 20 and 120 includes the inclined surfaces 13, 23, 113, and 123, respectively. However, as illustrated in FIG. 13A, first and second scintillators 210 and 220 may include stepped side surfaces 213a and 223a, respectively. Each of the side surfaces 213a and 223a has a surface continuously alternatingly including a surface extending in the predetermined direction Z and a surface extending in a direction perpendicular to the predetermined direction Z from a first end surface to a second end surface of each of the scintillators 210 and 220, respectively.

Figure 13B:
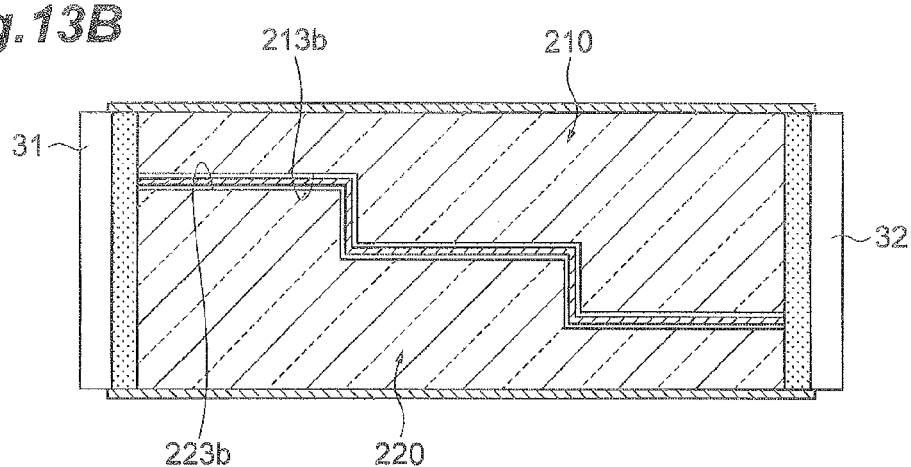
FIG. 13B is a cross-sectional view of a radiation detecting unit according to a second modification.
Figure 13C:
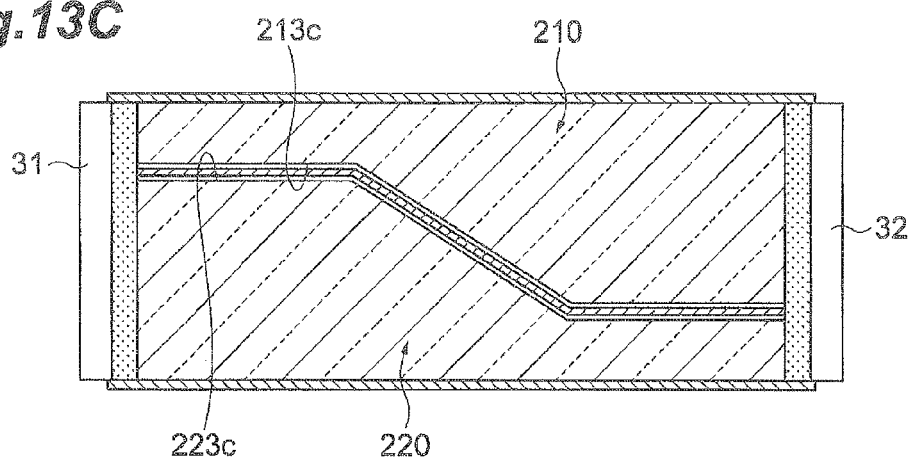
FIG. 13C is a cross-sectional view of a radiation detecting unit according to a third modification.

The side surfaces 213a and 223a include one step. However, as illustrated in FIG. 13B, the first and second scintillators 210 and 220 may include side surfaces 213b and 223b that have a plurality of steps (two steps in the example), respectively. As illustrated in FIG. 13C, the first and second scintillators 210 and 220 may include a inclined surface instead of the surface extending in the direction perpendicular to the predetermined direction Z. In this case, each of side surfaces 213c and 223c is a surface continuously alternatingly including a surface extending in the predetermined direction Z and an inclined surface inclining to a plane parallel to the predetermined direction Z from a first end surface to a second end surface of each of the scintillators 210 and 220, respectively.

In the above embodiments, the first end surface and the second surface of each of the scintillators are not limited to the above shapes. A shape of at least any of the first end surface and the second end surface may have a polygonal shape, such as a triangle or a pentagon, or a circular shape, such as a perfect circle or an ellipse.

In the above embodiments, the first optical reflector 41 is disposed between the respective scintillators. However, a configuration including no first optical reflector 41 may be provided. A configuration including the first optical reflector 41 disposed at least between any adjacent scintillators of the scintillators.

In the above embodiments, for example, a laser beam is emitted to each of the scintillators. A light scattering surface may be formed so as to be along each of the end surfaces at an arbitrary position in the predetermined direction Z in each of the scintillators. That is, scintillation light is attenuated by the light scattering surface. As a result, an amount of the scintillation light incident on each of the first and second photodetectors 31 and 32 (namely, the first and second light quantities) may be differentiated in accordance with a radiation incident position (an emitting position).

According to the aspect of the present invention, a radiation detector capable of accurately specifying a radiation incident position can be provided.

What is claimed is:

1. A radiation detector comprising:
a first scintillator including a first end surface positioned on a side of a first end in a predetermined direction, and a second end surface opposite to the first end surface and positioned on a side of a second end in the predetermined direction;
a second scintillator disposed in parallel to the first scintillator in a direction intersecting the predetermined direction, and including a first end surface positioned on a side of a first end in the predetermined direction and a second end surface opposite to the first end surface and positioned on a side of a second end in the predetermined direction;
a first photodetector configured to detect light emitted from the first end surface of each of the first and second scintillators;
a second photodetector configured to detect light emitted from the second end surface of each of the first and second scintillators;
a position specifying unit configured to specify each radiation incident position on which each radiation has been incident in each of the first and second scintillators based on each result detected by the first and second photodetectors,
wherein an area of the first end surface of the first scintillator is smaller than an area of the second end surface of the first scintillator, and
an area of the first end surface of the second scintillator is larger than an area of the second end surface of the second scintillator; and
a third scintillator disposed in parallel between the first and second scintillators, and including a first end surface positioned on a side of a first end in the predetermined direction, and a second end surface opposite to the first end surface and positioned on a side of a second end in the predetermined direction,
wherein the first photodetector further detects light emitted from the first end surface of the third scintillator,
the second photodetector further detects light emitted from the second surface of the third scintillator,
the position specifying unit specifies each radiation incident position on which each radiation has been incident in the first, second, and third scintillators based on each result detected by the first and second photodetectors,
an area of the first end surface of the third scintillator is larger than the area of the first end surface of the first scintillator and is smaller than the area of the first end surface of the second scintillator, and
an area of the second end surface of the third scintillator is smaller than the area of the second end surface of the first scintillator and is larger than the area of the second end surface of the second scintillator.

2. The radiation detector according to claim 1,
wherein at least one of the first and second scintillators includes a side surface including an inclined surface inclining to a plane parallel to the predetermined direction.

3. The radiation detector according to claim 2,
wherein in a case where a sum of a first light quantity of the amount of the light incident on the first photodetector and a second light quantity of the amount of the light incident on the second photodetector is defined as a reference value, a distribution ratio regarding a ratio between the first light quantity and the second light quantity mutually differs between when an emission occurs at a first end portion on the side of the first end in the predetermined direction in the first scintillator and when an emission occurs at a second end portion on the side of the second end in the predetermined direction in the first scintillator,
the distribution ratio regarding the ratio between the first light quantity and the second light quantity mutually differs between when an emission occurs at a first end portion on the side of the first end in the predetermined direction in the second scintillator and when an emission occurs at a second end portion on the side of the second end in the predetermined direction in the second scintillator,
the distribution ratio regarding the ratio between the first light quantity and the second light quantity mutually differs between when an emission occurs at a first end portion on the side of the first end in the predetermined direction in the third scintillator and when an emission occurs at a second end portion on the side of the second end in the predetermined direction in the third scintillator,
in a case where the distribution ratio is defined as A:B when the emission occurs at the first end portion of the first scintillator, the distribution ratio is defined as C:D when the emission occurs at the second end portion of the second scintillator, the distribution ratio is defined as E:F when the emission occurs at the first end portion of the third scintillator, and the distribution ratio is defined as G:H when the emission occurs at the second end portion of the third scintillator, $A<G<E<C$ and $B>H>F>D$ are satisfied.

4. The radiation detector according to claim 1,
further comprising an optical reflector disposed between the first and second scintillators.

5. The radiation detector according to claim 4,
wherein in a case where a sum of a first light quantity of the amount of the light incident on the first photodetector and a second light quantity of the amount of the light incident on the second photodetector is defined as a reference value, a distribution ratio regarding a ratio between the first light quantity and the second light quantity mutually differs between when an emission occurs at a first end portion on the side of the first end in the predetermined direction in the first scintillator and when an emission occurs at a second end portion on the side of the second end in the predetermined direction in the first scintillator,
the distribution ratio regarding the ratio between the first light quantity and the second light quantity mutually differs between when an emission occurs at a first end portion on the side of the first end in the predetermined direction in the second scintillator and when an emission occurs at a second end portion on the side of the second end in the predetermined direction in the second scintillator,
the distribution ratio regarding the ratio between the first light quantity and the second light quantity mutually differs between when an emission occurs at a first end portion on the side of the first end in the predetermined direction in the third scintillator and when an emission occurs at a second end portion on the side of the second end in the predetermined direction in the third scintillator, in a case where the distribution ratio is defined as A:B when the emission occurs at the first end portion of the first scintillator, the distribution ratio is defined as C:D when the emission occurs at the second end portion of the second scintillator, the distribution ratio is defined as E:F when the emission occurs at the first end portion of the third scintillator, and the distribution ratio is defined as G:H when the emission occurs at the second end portion of the third scintillator, A<G<E<C and B>H>F>D are satisfied.

6. The radiation detector according to claim 1,
wherein at least one of the first and second scintillators includes a side surface including an inclined surface inclining to a plane parallel to the predetermined direction, and
further comprising an optical reflector disposed between the first and second scintillators.

7. The radiation detector according to claim 6,
wherein in a case where a sum of a first light quantity of the amount of the light incident on the first photodetector and a second light quantity of the amount of the light incident on the second photodetector is defined as a reference value, a distribution ratio regarding a ratio between the first light quantity and the second light quantity mutually differs between when an emission occurs at a first end portion on the side of the first end in the predetermined direction in the first scintillator and when an emission occurs at a second end portion on the side of the second end in the predetermined direction in the first scintillator,
the distribution ratio regarding the ratio between the first light quantity and the second light quantity mutually differs between when an emission occurs at a first end portion on the side of the first end in the predetermined direction in the second scintillator and when an emission occurs at a second end portion on the side of the second end in the predetermined direction in the second scintillator,
the distribution ratio regarding the ratio between the first light quantity and the second light quantity mutually differs between when an emission occurs at a first end portion on the side of the first end in the predetermined direction in the third scintillator and when an emission occurs at a second end portion on the side of the second end in the predetermined direction in the third scintillator,
in a case where the distribution ratio is defined as A:B when the emission occurs at the first end portion of the first scintillator, the distribution ratio is defined as C:D when the emission occurs at the second end portion of the second scintillator, the distribution ratio is defined as E:F when the emission occurs at the first end portion of the third scintillator, and the distribution ratio is defined as G:H when the emission occurs at the second end portion of the third scintillator, A<G<E<C and B>H>F>D are satisfied.

8. The radiation detector according to claim 1,
wherein in a case where a sum of a first light quantity of the amount of the light incident on the first photodetector and a second light quantity of the amount of the light incident on the second photodetector is defined as a reference value, a distribution ratio regarding a ratio between the first light quantity and the second light quantity mutually differs between when an emission occurs at a first end portion on the side of the first end in the predetermined direction in the first scintillator and when an emission occurs at a second end portion on the side of the second end in the predetermined direction in the first scintillator,
the distribution ratio regarding the ratio between the first light quantity and the second light quantity mutually differs between when an emission occurs at a first end portion on the side of the first end in the predetermined direction in the second scintillator and when an emission occurs at a second end portion on the side of the second end in the predetermined direction in the second scintillator,
the distribution ratio regarding the ratio between the first light quantity and the second light quantity mutually differs between when an emission occurs at a first end portion on the side of the first end in the predetermined direction in the third scintillator and when an emission occurs at a second end portion on the side of the second end in the predetermined direction in the third scintillator,
in a case where the distribution ratio is defined as A:B when the emission occurs at the first end portion of the first scintillator, the distribution ratio is defined as C:D when the emission occurs at the second end portion of the second scintillator, the distribution ratio is defined as E:F when the emission occurs at the first end portion of the third scintillator, and the distribution ratio is defined as G:H when the emission occurs at the second end portion of the third scintillator, A<G<E<C and B>H>F>D are satisfied.

* * * * *